United States Patent [19]

Perlot

[11] Patent Number: 5,092,650

[45] Date of Patent: Mar. 3, 1992

[54] BED FOR A RECREATIONAL VEHICLE

[75] Inventor: Mathew M. Perlot, Eugene, Oreg.

[73] Assignee: Safari Motor Coaches, Inc., Harrisburg, Oreg.

[21] Appl. No.: 700,214

[22] Filed: May 13, 1991

[51] Int. Cl.⁵ .......................................... B62D 27/00
[52] U.S. Cl. .................................. 296/190; 296/164; 5/11; 5/118
[58] Field of Search .................. 296/164, 190; 5/11, 5/118

[56] References Cited

U.S. PATENT DOCUMENTS

| | | | |
|---|---|---|---|
| 3,184,766 | 5/1965 | Mortrude | 5/118 |
| 3,588,168 | 6/1971 | Froitzheim | 296/190 |
| 3,879,081 | 4/1975 | Hockley et al. | 296/190 |
| 4,215,899 | 8/1980 | Schmidt et al. | 296/190 |
| 4,940,277 | 7/1990 | Buell | 296/164 |
| 4,979,248 | 12/1990 | Kelley | 5/118 |

Primary Examiner—Robert R. Song
Attorney, Agent, or Firm—Robert L. Harrington

[57] ABSTRACT

A bed for a recreational vehicle that is stored near the ceiling in the front portion of the vehicle when not in use and is lowered for usage. The bed when stored above the driver's area does not interfere with the operation of the vehicle. The bed is lowered into the seating area when made available for use. The bed movement is power actuated over a height difference of two and one-half to three feet. The seats are adjusted out of the path of the bed and the power mechanism is interrupted when items are in the path of the bed movement. The power actuator is contained within the bed frame and movement is controlled by a rack and pinion mounting.

8 Claims, 4 Drawing Sheets

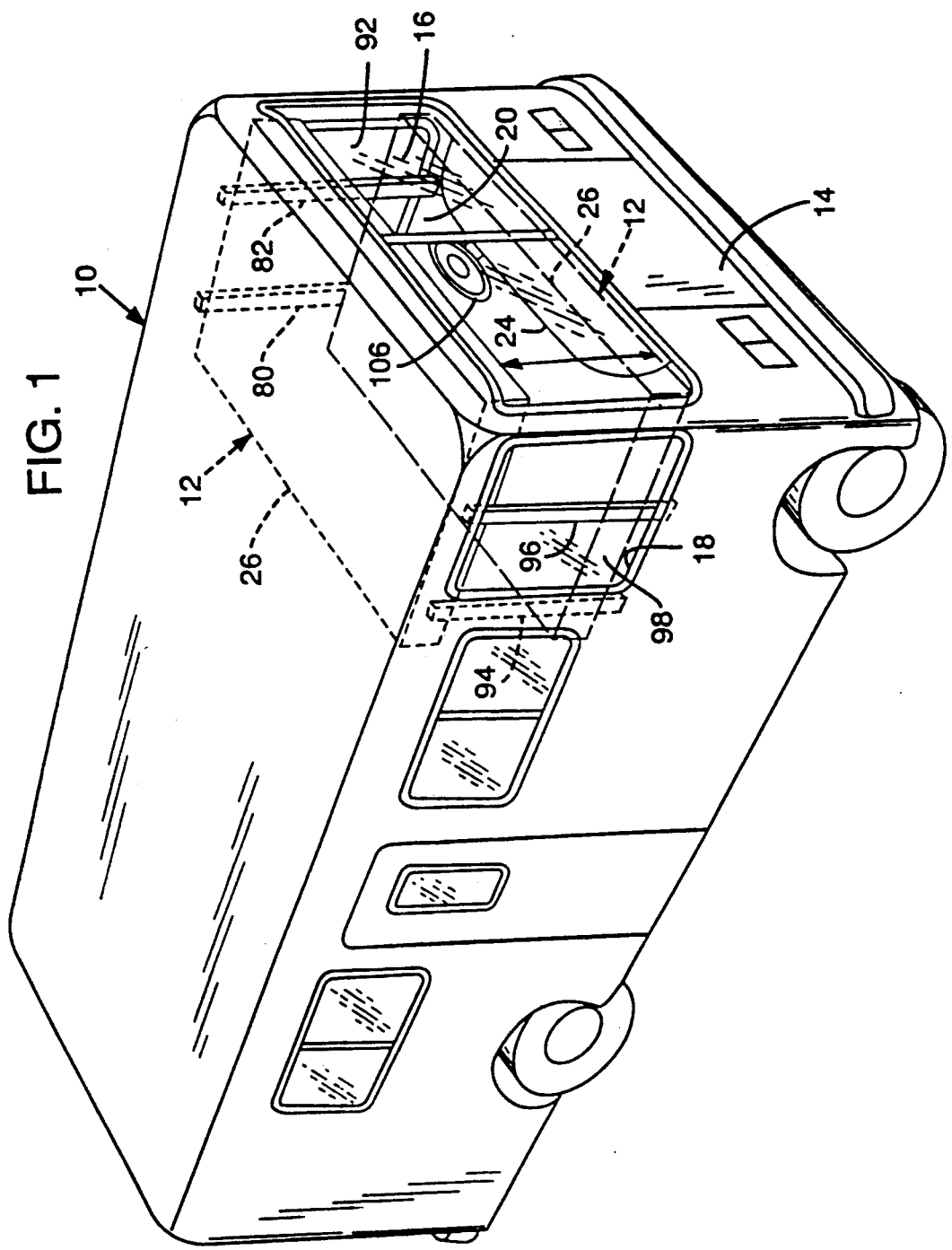

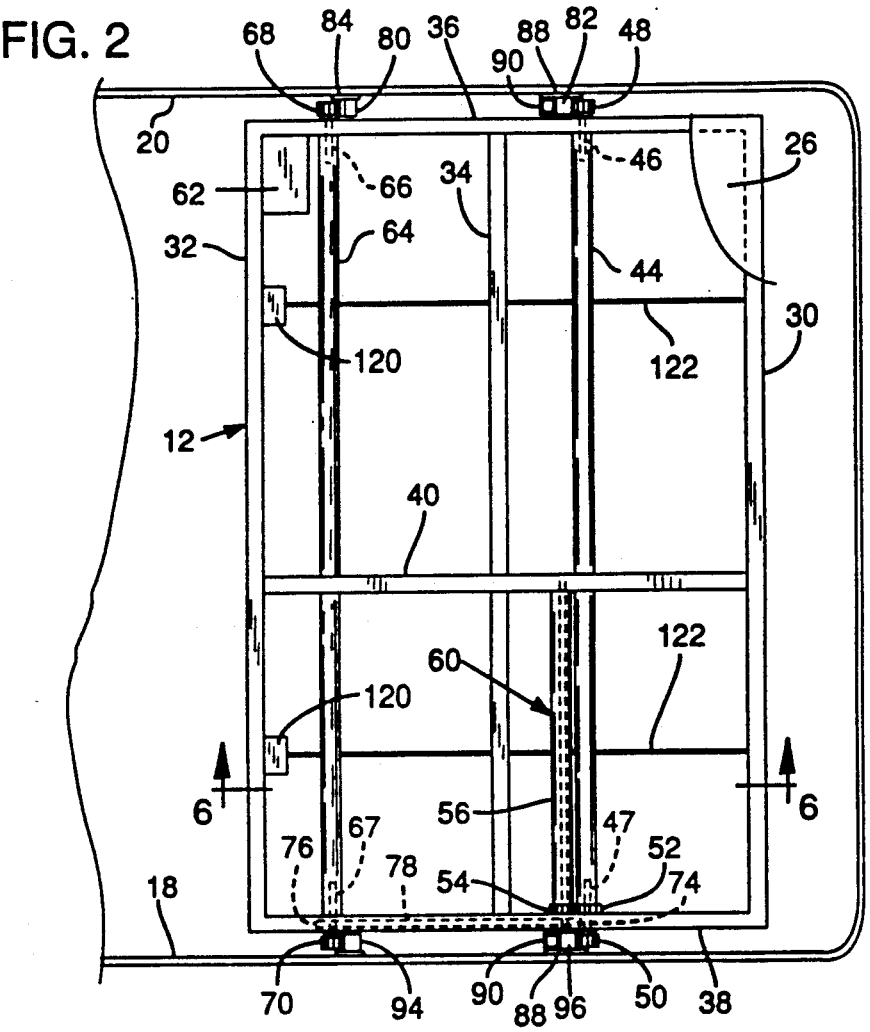
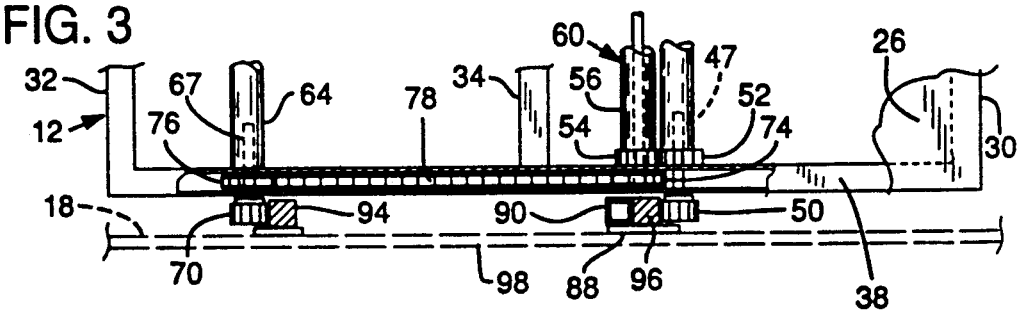
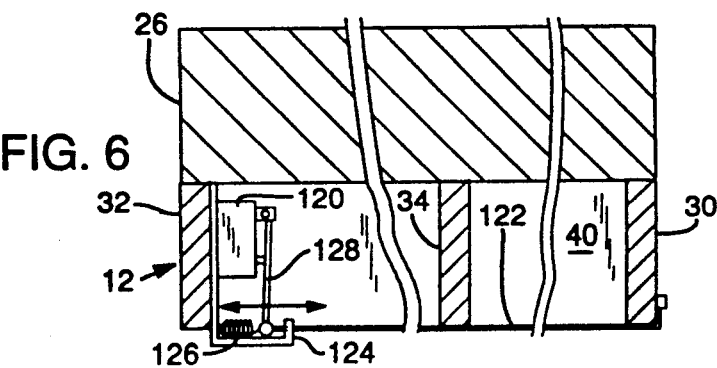

BED FOR A RECREATIONAL VEHICLE

BACKGROUND INFORMATION

1. Field of the Invention

This invention relates to a bed that is stored adjacent the ceiling of a recreation vehicle, e.g. a motor home and is lowered to a position for accessibility and use, and more particularly it relates to the design of, and the power actuated mechanism for, raising and lowering the bed.

2. Background Information

Recreation vehicles, such as motor homes, all share a common need. That is to provide the greatest number of desired features in the least amount of space. The space the bed occupies has been a major target for saving space. When the users are sleeping, many other features are not in use and vice versa. Thus, to the extent feasible, the bed space can be convertible for one use during the day and for bed space at night. Beds have heretofore been hidden in couches to convert the sitting room space and they have been designed into dining booths to convert the eating area. In motor homes, a targeted area is the space over the driver's area at the front of the motor home. (Hereafter, the reference to "driver's area" includes the full width of that area at the front of the vehicle having fixed driver and passenger seating for use while the vehicle is in transit.)

It is not uncommon to provide a bed suspended over the driver's area of a motor home. Such beds are often provided with a manual fold down mechanism to raise and lower the bed, e.g. from a position tight up against the ceiling (and out of the way of individuals seated in the driver/passenger seats) to a lowered position where enough room is provided between the bed and ceiling to accommodate one or two persons. However, the bed is typically several feet off the floor even in the lowered position. Getting in and out of the bed is difficult and persons lying in the bed are uncomfortably close to the ceiling. Sitting up in the bed is not feasible, the sleeping space has a "closed-in" feel and the area being close to the ceiling is typically too warm for comfortable sleeping.

Accordingly, an object of the present invention is to provide a design and mechanism for an overhead, out of the way bed, e.g. for motor homes, that has a powered mechanism to raise and lower the bed from an upper position against the ceiling to a lower position, e.g. two and one-half to three feet lower, to place the bed closer to the floor and thereby avoid the discomfort and inconvenience as described above.

BRIEF SUMMARY OF THE INVENTION

The preferred embodiment of the present invention includes a design for an overhead bed for a motor home driver's area wherein a substantially cubicle open space is provided that extends from a lower position, e.g. at the height of the steering wheel or dashboard and well below the seat back to the ceiling. This distance typically measures about three feet as compared to about one and one-half feet for prior overhead beds. The cubicle open space extends from side wall to side wall (which provides the bed length) and from the front of the motor home rearward a distance typically accommodating a double width bed.

The preferred design provides for the steering wheel and seat backs which extend into the cubicle area to be tilted out of the area in preparation for lowering the bed. The lowering (and raising) mechanism includes a pair of gear racks mounted at each side wall and a pair of spur gears (pinions) rotatably mounted to opposed end rails of the bed's frame. The spur gears are adapted to engage the gear teeth of the gear rack whereby rotation of the spur gears results in raising and lowering of the bed frame. A drive motor having an elongated cylindrically shaped and rotatable housing is mounted within the bed's frame. The four spur gears and motor housing are interconnected. The motor is driven in forward and reverse modes for simultaneously driving the four spur gears up and down the gear rack to raise and lower the bed frame as desired.

In a prior attempt of the assignee hereof to provide a powered overhead bed, the bed frame was raised and lowered by suspension cables wound onto a rotatable shaft. A motor rotated the shaft to wind and unwind the cables. Problems that were encountered and unresolved were: The mechanism for raising and lowering the bed was difficult to service, the cable was considered visually unappealing, and there wasn't adequate control over the power mechanism, i.e., to prevent crashes when in-the-way items were not removed. In the present invention, the gear rack and spur gears can be substantially hidden, and to the extent exposed, does not generate a perceptible wearing as with cable, and the drive motor is provided with a control to insure appropriate control and 15 thereby avoid damaging "crashes".

The invention and its advantages will become more apparent by reference to the following detailed description and drawings herein.

BRIEF DESCRIPTION OF THE DRAWINGS

FIG. 1 is a cut-a-away view of a motor home showing the bed of the present invention;

FIG. 2 is a plan view of a frame of the bed illustrated in FIG. 1 mounted on linear gear racks fastened to the walls of the motor home of FIG. 1;

FIG. 3 is a portion of FIG. 2 enlarged to show the drive mechanism;

FIGS. 6 and 6A are views showing the mounting of power interrupt devices.

DESCRIPTION OF THE PREFERRED EMBODIMENT

Figure 4:
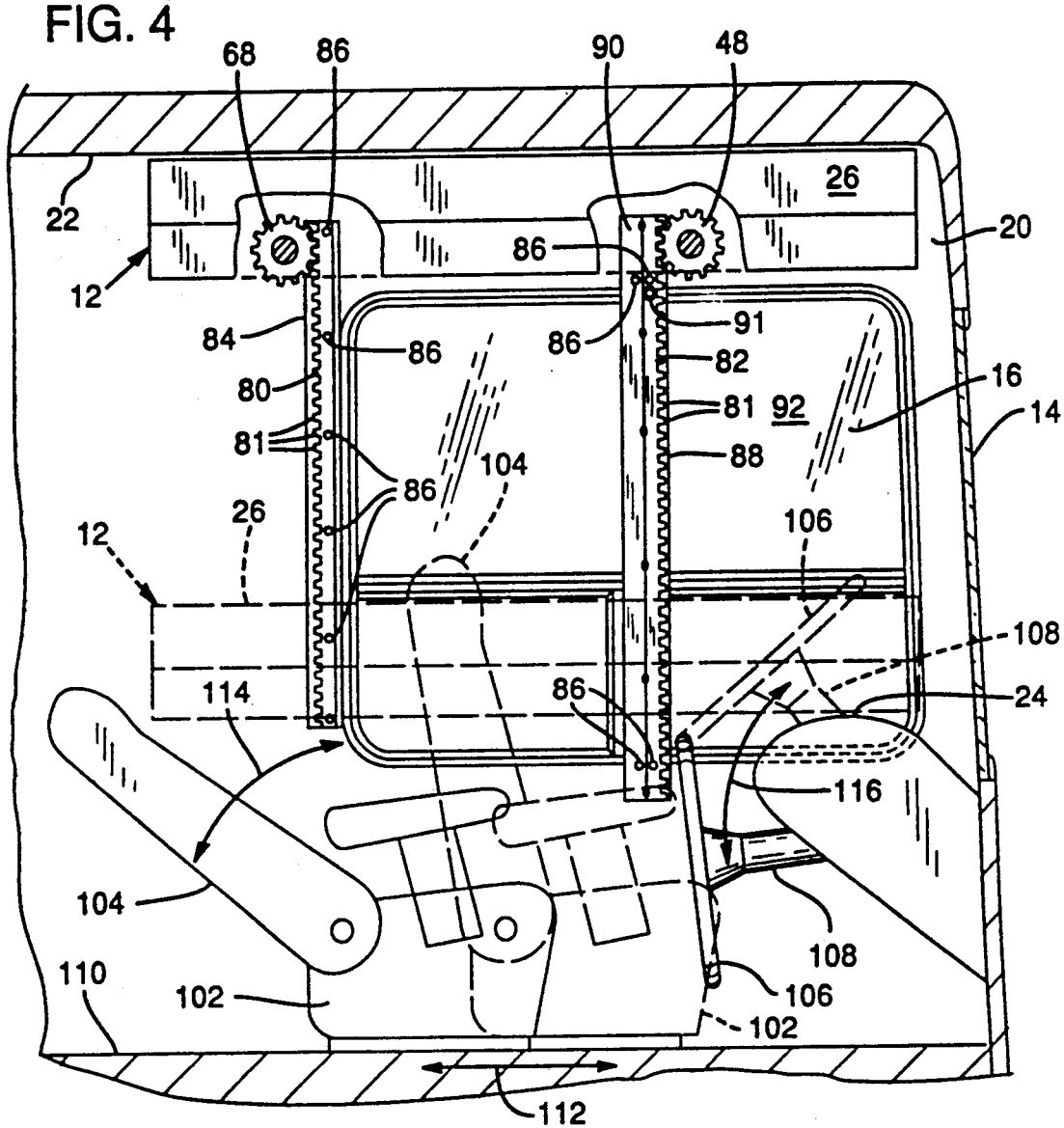
FIG. 4 is a partial side view in section of the driver's side of the driver's area of the motor home of FIG. 1.

Refer now to FIG. 1 of the drawings. It illustrates a popular recreational vehicle known as a motor home. The recreational vehicle, which hereafter will be referred to as a motor home 10 is a self propelled unit having its own engine and is outfitted with the comforts of home. Typically, to name a few of the comforts, the motor home 10 will be equipped with kitchen facilities, bath facilities, heating facilities, sleeping facilities and water handling equipment for both fresh and waste water.

The present invention is directed to the sleeping facilities of the motor home 10. In particular it is directed to a bed 12, the cubicle or space that the bed 12 occupies and the mounting and movement of the bed 12 in the cubicle.

As FIG. 1 illustrates in its cutaway view, the bed 12 is mounted within the front portion 14 of the motor home 10. The front portion 14 of the motor home 10 includes the drivers area which is typically equipped with steering wheel, driver and passenger chairs and dash board. As is illustrated and will be described, the bed 12 is mounted in and moveable in a cubicle-like space generally indicated by the numeral 16 at the front portion 14 of the motor home 10. For reference the motor home 10 has, in its interior, a side wall 18 on the passenger side and a side wall 20 on the drivers side (The side wall 18 being adjacent the passenger chair and the side wall 20 being adjacent the drivers chair) The space 16 has an upper limit defined by the ceiling 22 and a lower limit defined by the top of the dash 24 of the motor home 10.

Refer now to FIG. 2 of the drawings which illustrates a rectangular rigid frame of the bed 12. The frame includes side rails 30, 32 (cross braces) that are arranged in a parallel configuration and are fixedly joined to end rails 36, 38 as by welding. For added rigidity and strength and for the mounting of a drive motor 60, a cross rail 40, parallel to the end rails 36, 38, is fitted between the side rails 30, 32. A center rail 34, parallel to the side rails 30, 32, is fitted between the end rails 36, 38 as by welding to provide added strength and rigidity. As shown in the drawing, rail 40 is positioned at a strategic distance from the rail 38 to accommodate the mounting of the motor 60 which will later be explained. The rails are preferably of angle iron construction but other well known structural members may also be utilized.

The rails 36 and the rail 38 are suitably bored (not shown) in a conventional manner for the rotatable mounting of a torque tube 44. The rail 40 is suitably bored or relieved so the tube 44 will extend unobstructed from rail 36 to rail 38. As shown the torque tube 44 extends from rail 36 to an attached pinion 52 adjacent the rail 38. The torque tube 44 has a shaft 46 that extends through a bore in and beyond the rail 36 and has a shaft 47 that extends from the end of the tube 44 through a bore in and beyond the rail 38. The shafts 46 and 47 are fixedly attached to the ends of the tube 44 and are rotatably mounted in suitable bearings provided in the bores in the rails 36 and 38 in a conventional known manner. A pinion 48 is fixedly removably mounted to the end of the shaft 46 that extends beyond the rail 36. A pinion 50 is fixedly removably mounted on the end of the shaft 47 extending beyond the rail 38. A pinion 52 is fixedly removably mounted on the shaft 47 adjacent the end of the tube 44. The pinions 48, 50 and 52 are fixedly attached to the shafts in a conventional manner as by key and set screw.

A motor 60 is fixedly attached to the rail 40 and extends to the rail 38 parallel to the torque tube 44. The motor 60 is of the type as sold by SOMFY SYSTEMS, INC., 2 Sutton Place, Edison, New Jersey. The motor 60 differs from most conventional motors in that it is of the type that has a fixed center shaft and a rotatable housing 56. A motor pinion 54 and a gear 74 are affixed to the end of the housing 56 and will rotate with the housing 56. The fixed center shaft of the motor 60 is fixedly attached to the rail 40 in a conventional manner with the housing 56 extending parallel to the torque tube 44 so that the motor pinion 54 fixed to the end of the housing 56 is in mesh with pinion 52 of the torque tube 44. The motor has a planetary drive arrangement to provide a low RPM output and has a solenoid operated disc brake to prevent rotation excepting under the power of the motor. The power input to the motor 60 is controlled by a reversing momentary contact switch 62 that is mounted to the frame of the bed 12.

The rails 36 and the rail 38 are suitably bored for the rotatable mounting of a second torque tube 64. The torque tube 64, spaced from and parallel to the torque tube 44 is fitted between the rails 36, 38. The rail 40 is suitably bored or relieved so the tube 64 will extend unobstructed from rail 36 to rail 38. The torque tube 64 has a shaft 66 that extends through a bore in and beyond the rail 36. A pinion 68 is fixedly removably mounted on the end of the shaft 66 extending beyond the rail 36. The torque tube 64 has a shaft 67 that extends through a bore in and beyond the rail 38. A gear 76 is mounted on the shaft 67 and is in alignment with the gear 74 affixed to the housing 56 of the motor. A pinion 70 is mounted on the end of the shaft 67 extending beyond the rail 38. The shafts 66 and 67 are rotatably mounted in suitable bearings fitted in the bores of the rails 36, 38. The pinions 68 and 70 and gear 76 are removably mounted to the shafts in a conventional manner, as by key and set screw.

The torque tube 44, the motor 60 and the torque tube 64 are coupled to rotate in unison. As shown in FIG. 3, the gear 74 affixed to the end of the housing 56 adjacent the motor pinion 54 and the gear 76 mounted on the shaft 67 of the torque tube 64 are in alignment. A chain 78, such as a roller chain, is entrained around the aligned gears 74 and 76 to rotatively couple the motor housing 56 and torque tube 64. The torque tube 44 is coupled to the motor housing 56 by the meshed engagement of the motor pinion 54 and the pinion 52 of the torque tube 44. The torque tube 44 and torque tube 64 will thus counter-rotate in unison as the motor 60 is driven.

Refer now to FIG. 4 of the drawings. It shows linear racks 80 and 82 mounted to the interior side wall 20 of the motor home 10. Each rack 80, 82 has gear teeth 81 that will engage, that is will mesh with pinions 48, 68 of the driver's side of torque tubes 44, 64, respectively. Rack 80 has a back-up plate 84 fixedly attached to the rack 80, as by welding, for added rigidity and strength. The back-up plate 84 also extends beyond the crest of the gear teeth 81 of the rack 80 (best seen in FIG. 4). The rack 80 with attached plate 84 is fastened to the wall 20 by multiple fasteners 86, such as bolts fitting in spaced holes. The rack 82, as shown in FIGS. 2 and 4, has a back up plate 88 and a re-enforcing member 90, preferably of square tubing. The back-up plate 88 is fastened to the rack 82 as by plug welding and the member 90 is fastened to the rack and the plate 88 as by welding in a known conventional manner. The rack 82, as shown in FIG. 4 spans the window 92 and the member 90 is provided for added strength and rigidity. The rack 82 with the attached plate 88 and member 90 is fastened to the wall 20 by fasteners 86.

Referring once again to FIGS. 2 and 3, another set of racks 94 and 96 similar to racks 80 and 82 are fitted to the interior wall 18 of the motor home 10. The rack 96 will span a window 98 (see FIG. 1) and is therefore re-enforced in the same manner as rack 82. The rack 94 is assembled in the same manner as rack 80. The racks 94 and 96 are mounted to the wall 18 spaced in a parallel arrangement to cooperatively receive in mesh the pinions 50 and 70 of the frame 12. As shown, the pinion 70 is in mesh with the gear teeth 81 of the rack 94 and the pinion 50 is in mesh with the gear teeth 81 of the rack 96. The frame of the bed 12 is thus mounted between the walls 18 and 20. The backup plates 84 of the racks 80 and 94 and the back up plates 88 of the racks 82 and 90 which extend beyond the crest of the gear teeth 81 prevent lateral movement of the bed 12 by limiting the side motion of the pinions relative to the racks.

As will be noted from FIG. 4, the bed 12 is mounted on the racks parallel to the floor 110 and is moveable vertically between an upper limit defined by the ceiling 22 and a lower limit defined by the top of the dash 24. From FIG. 4, it will be noted that each rack 82 and 96 have a drilled hole for the insertion of a safety pin 91. The safety pin 91 is inserted when the bed 12 has been elevated to its upper limit. The pin 91 is an added safeguard to prevent the bed 12 from being lowered inadvertently.

Refer now again to FIG. 4 of the drawings. It shows the bed 12 mounted on the linear racks in the cubicle-like space 16 in the front portion 14 of the motor home 10. For clarity, only the drivers side including the drivers chair (seat) 102, the steering wheel 106 and steering wheel column 108 and the dash 24 are shown. The bed 12 including mattress 26 is shown in solid line at the upper limit of its motion, the top of the mattress 26 being in close proximity to the ceiling 22, and at its lower limit of motion it is shown in outline. The drivers chair (seat) 102 and the steering wheel column 108 and steering wheel 106 are shown in outline in the normal position for driving the motor home 10 down a roadway. The lower limit of the cubicle-like space 16 is on a plane that extends rearwardly into the motor home from the top of the dash 24 parallel to the floor 110 and as shown in the figure, the drivers chair (seat) back and the steering wheel are in the space when set for normal driving or operating positions (the passenger chair back will also be in the space 16). To lower the bed 12 to its lower limit, the chair back 104 (for both the driver's and passenger's chair) and the steering wheel must be moved out of the space 16.

The chair (seat) 102 is movably mounted to the floor 110 of the motor home 10 and as indicated by the directional arrow 112, the chair (seat) 102 is moveable toward and away from the dash 24. The chair back 104 may be tilted as indicated by the directional arrow 114. The chair back is thus moveable out of the area of the space 16 occupied by the bed 12 when lowered to its lowest position by moving the chair (seat) 102 away from the dash and tilting the chair back 104 rearward (as shown in solid line). The passenger chair is similarly mounted and moveable.

The steering column 108 may be tilted as indicated by the directional arrow 116. The steering wheel 106 is thus moveable out of the cubicle-like space 16 by tilting the column 108 downward.

Figure 5:
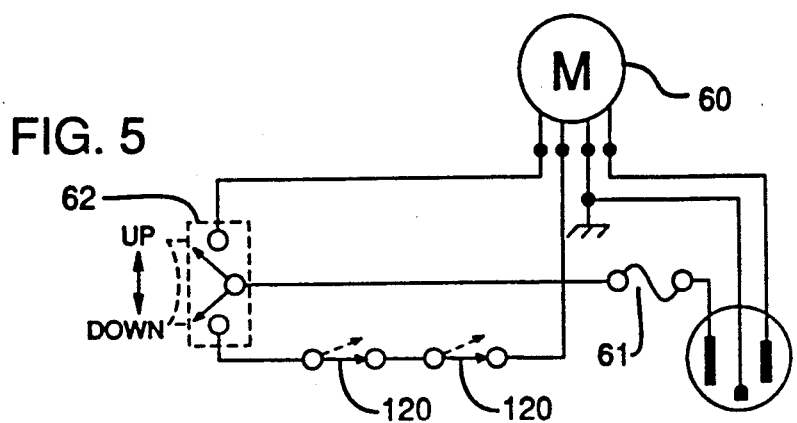
FIGS. 5 and 5A are circuit diagrams.

Movement of the bed 12, either upwardly or downwardly, is controlled by the reversing switch 62. The torque of the motor 60 is closely matched to the load, i.e. the power required to raise or lower the bed. Thus if an object is encountered, such as the chair back due to the operator failing to move the chair back 104 out of the space 16, the frame of the bed 12 will contact the chair back 104 causing the motor 60 to stall. A circuit diagram for the motor 60 and switch 62 is as illustrated in FIG. 5. The motor 60 is protected by a fuse 61.

Instead of relying on the stalling of the motor in the event the bed 12 is forced against an object, a current detector can be designed into the circuit. The detector which detects current spikes will shut the motor off in the event a large load is encountered, such as the bed 12 coming into an object as it is either elevated or lowered. Spike detectors of the type contemplated are well known in the art and could for example be provided in the circuitry of switch 62.

Another alternative to relying solely on the stalling of the motor is to provide proximity switches 120 on the frame of the bed as shown in the circuit diagram of FIG. 5 and as illustrated in FIG. 6. The switches 120 having a mounting bracket 124 are mounted to the rail 32 of the bed 12. A connecting cable 122 has one end fixedly mounted to the rail 30 and an opposite end extending through an opening in the bracket 124 and connected to a biasing spring 126 which in turn is fixedly attached to the bracket 124. A switch operating lever 128 is connected to the end of the cable 122 extending through the opening in the bracket. The cable 122 is extended between the rail 30 and 32 on the centerline of the seat back of the driver's chair and the steering wheel. Another cable 122 and switch 120 is mounted strategically in reference to the passenger chair. Any object contacting either or both of the cables 122 will activate either one or both of the switches 120 to interrupt power to the motor 60 for moving the bed downward.

Figure 5A:
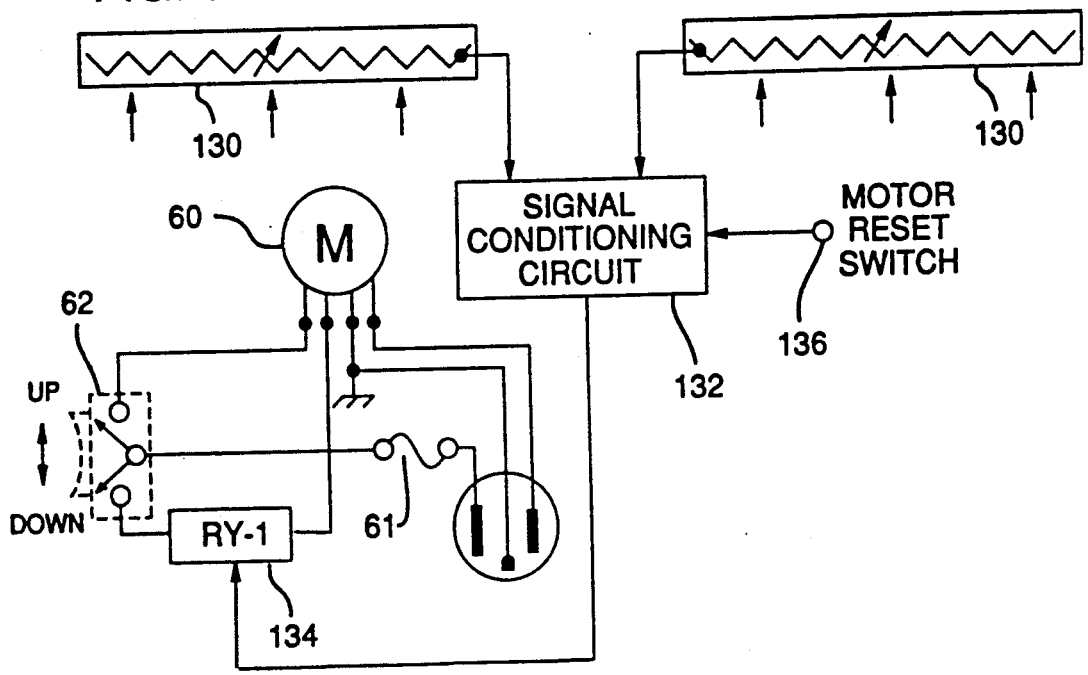
Figure 6A:
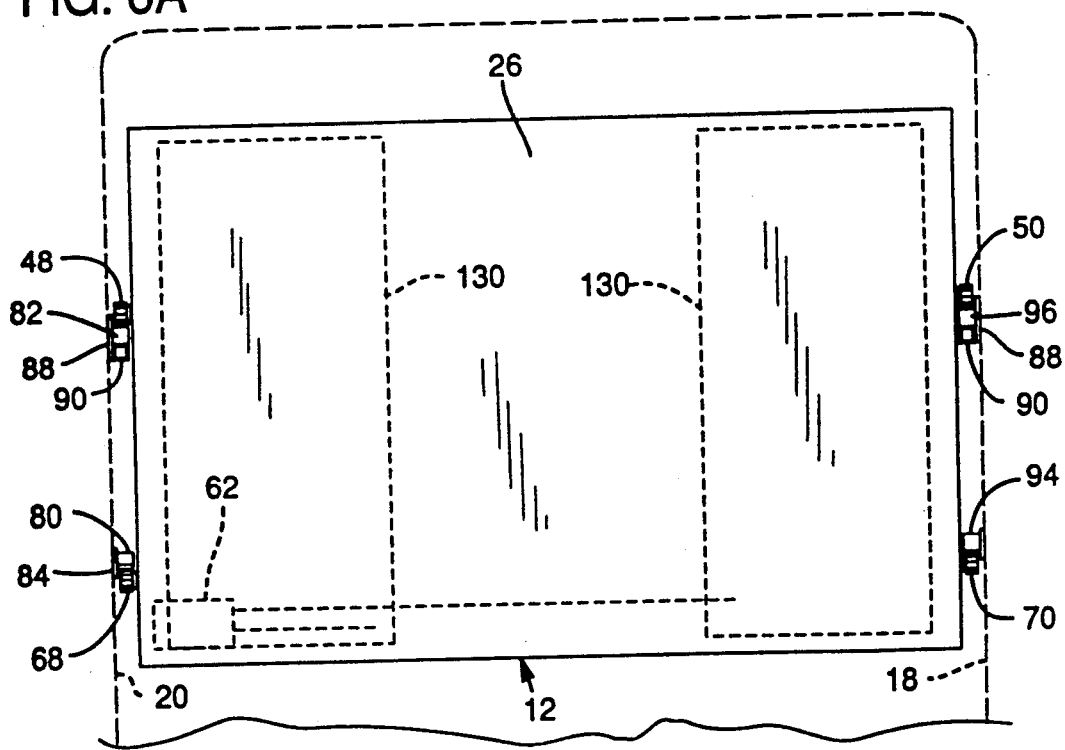

FIG. 6A illustrates a preferred arrangement for detecting the interference between the frame of the bed 12 and an object as the bed descends downward. Pressure sensitive mats 130 are fitted to the under side of the frame of the bed 12. The mats are fitted over a large area and thus will detect any significant contact by any object that contacts the mat or mats. Typically two mats 130 will be fitted to the underside of the frame of the bed with each mat extending substantially across the width of the bed and each mat will extend along the length of the bed for a distance of about thirty inches. The size, number and the location of the mats on the underside of the bed will of course be determined by the need. A signal conditioning circuit 132 interconnecting the mats 130 to the motor circuit as shown in FIG. 5A will trip a relay 134 (switch) to stop the motor 60 in the event an object contacts the mat 130 (or mats). A motor reset switch 136 is provided in the circuit to reset the relay 134 for continued operation after the object has been removed from the travel path of the frame of the bed 12.

The bed of the present invention and the embodiments described and illustrated have been directed to a motor home. It is apparent that the bed is applicable to other recreational vehicles, such as travel trailers and the like.

Those skilled in the art will recognize that variations and modifications may be made without departing from the true spirit and scope of the invention. The invention is therefor not to be limited to the embodiments illustrated and described but is to be determined from the appended claims.

I claim:

1. In a mobile recreation vehicle having a cubicle space which is accessible for storing an overhead bed in a raised position and then lowering it for use while the recreation vehicle is parked, an overhead bed provided in said space comprising;

a rigid bed frame including end rails and cross braces interconnecting said end rails in spaced parallel relationship;

at least two pairs of pinions having gear teeth, each pair having a pinion rotatably mounted to each end rail and a first rigid connecting member extended between and interconnecting the pinions of each pair of pinions to force rotation of each pair of pinions in unison, and a second connecting member extended between and interconnecting the two pair of pinions to force rotation of the pinion pairs in unison;

a linear gear rack for each pair vertically mounted to the vehicle adjacent the end rails with the respective gear teeth of the gear racks and pinions inter-engaged;

a motor mounted to said bed frame, said motor selectively rotatably driving at least one of said pinions and through said first and second connecting members rotatably driving said pairs of pinions for raising and lowering the bed frame.

2. In a motor home having a driver's area including a dash board defining a lower height level and a ceiling defining an upper height level, said driver's area including a steering wheel, a driver's seat and a passenger's seat, all of which are extended in part above the lower height level, a bed mounted for vertical adjustment within said driver's area between said lower height level and said upper height level, apparatus providing said adjustment comprising;

means for adjusting the steering wheel, driver's seat and passenger's seat out of the area of bed adjustment within said driver's area;

mounting means providing for height adjustment of said bed between said lower height level and said upper height level;

power means for selectively adjusting the bed between said lower height level and said upper height level; and control means including interference detection means for detecting the presence of an object in said area of height adjustment to prevent powered adjustment of the bed when an object is detected.

3. Apparatus as defined in claim 2 wherein the control means and interference detection means comprises the matching of the power means to the requirements of raising and lowering the bed whereby the added resistance of an object in the path of movement exceeds the capability of the power means.

4. Apparatus as defined in claim 2 wherein the interference detection means comprises a power spike detection means as generated by the presence of an object in the path of the bed adjustment and said control means is responsive to a power spike to de-activate the power means.

5. Apparatus as defined in claim 2 wherein the interference detection means includes a switch that is activated by contact of the bed with an object within the area of bed adjustment.

6. Apparatus as defined in claim 2 wherein said bed comprises;

a rigid bed frame including end rails and cross braces interconnecting said end rails in spaced parallel relationship;

at least two pair of pinions having gear teeth, each pair having a pinion mounted to each end rail and a first rigid connecting member extended between and interconnecting the pinions of each pair of pinions to force rotation of each pair of pinions in unison, and second connecting member extended between and interconnecting the two pair of pinions to force rotation of the pinion pairs in unison;

a linear gear rack for each pair vertically mounted to the vehicle adjacent the end rails with the respective gear teeth of the gear racks and pinions inter-engaged;

a motor mounted to said bed frame, said motor selectively rotatably driving at least one of said pinions and through said first and second connecting members rotatably driving said pairs of pinions for raising and lowering the bed frame.

7. An overhead bed as defined in claim 1 wherein said motor is a cylindrical motor of a size to fit the confines of the bed frame.

8. An overhead bed as defined in claim 7 wherein said motor includes a central non-rotatable shaft and a rotatable housing, said shaft fixed to said bed frame, and gear teeth provided on said housing and inter-engaged with one of said pinions.

* * * * *